United States Patent
Cartagena et al.

(10) Patent No.: US 11,526,685 B1
(45) Date of Patent: Dec. 13, 2022

(54) SYSTEMS AND METHODS TO DETERMINE A MACHINE-READABLE OPTICAL CODE BASED ON A STORED SCREEN-CAPTURED IMAGE

(71) Applicant: OUTLAYR, INC., Santa Monica, CA (US)

(72) Inventors: Carl Michael Cartagena, Santa Monica, CA (US); Mark Jered Verrico, Round Rock, TX (US); Jonathen Christopher Wong, San Dimas, CA (US)

(73) Assignee: Outlayr, Inc., Los Angeles, CA (US)

( * ) Notice: Subject to any disclaimer, the term of this patent is extended or adjusted under 35 U.S.C. 154(b) by 0 days.

(21) Appl. No.: 17/349,827

(22) Filed: Jun. 16, 2021

(51) Int. Cl.
*G06F 3/0481* (2022.01)
*G06K 7/14* (2006.01)

(52) U.S. Cl.
CPC ........ *G06K 7/1447* (2013.01); *G06F 3/0481* (2013.01)

(58) Field of Classification Search
CPC .. G06K 7/1404; G06K 7/1439; G06K 7/1447; G06F 3/0481
See application file for complete search history.

(56) References Cited

U.S. PATENT DOCUMENTS

| | | | |
|---|---|---|---|
| 10,237,583 B1 | 3/2019 | Allen | |
| 10,423,657 B2 | 9/2019 | Pearlman | |
| 11,062,100 B1 | 7/2021 | Cartagena | |
| 2002/0149699 A1 | 10/2002 | Mizobuchi | |
| 2012/0085819 A1* | 4/2012 | Choi | H04N 21/4223 235/375 |
| 2013/0291024 A1 | 10/2013 | Lefevre | |
| 2015/0095855 A1 | 4/2015 | Bai | |
| 2015/0113557 A1 | 4/2015 | Kim | |
| 2016/0253127 A1* | 9/2016 | Panda | G06K 19/06112 358/1.15 |
| 2018/0157885 A1* | 6/2018 | Gurzumar | G06K 7/10722 |
| 2018/0218234 A1 | 8/2018 | Engineer | |
| 2019/0052697 A1* | 2/2019 | Wu | H04L 67/06 |
| 2019/0057614 A1 | 2/2019 | Reilly | |
| 2019/0377476 A1 | 12/2019 | Wong | |

OTHER PUBLICATIONS

Wadih Sawaya et al., Detection and Iterative Decoding of a 2D Alphabetic Barcode, Sep. 1, 2009, IEEE Xplore, pp. 1-6 (Year: 2009).*
Nivedan Bhardwaj et al., Decoding Algorithm for color QR code: A Mobile Scanner Application, Apr. 1, 2016, IEEE Xplore, pp. 1-6 (Year: 2016).*

* cited by examiner

*Primary Examiner* — Tam T Tran
(74) *Attorney, Agent, or Firm* — Esplin & Associates, PC

(57) ABSTRACT

Systems and methods configured to determine a machine-readable optical code based on screen-captured video are disclosed. Exemplary implementations may: monitor, in an ongoing manner, a directory to determine whether a screen-captured image is added; effectuate, responsive to the determination that the screen-captured image is included in the directory, an image decoding machine configured to parse and decode images and/or the video frames for information embedded into the images and/or the video frames to: parse the screen-captured image for a machine-readable optical code; extract embedded information from the machine-readable optical code; and decode the embedded information for metadata; and effectuate, via the user interface, presentation of information derived from the metadata.

18 Claims, 5 Drawing Sheets

SYSTEMS AND METHODS TO DETERMINE A MACHINE-READABLE OPTICAL CODE BASED ON A STORED SCREEN-CAPTURED IMAGE

FIELD OF THE DISCLOSURE

The present disclosure relates to systems and methods to determine a machine-readable optical code based on a stored screen-captured image.

BACKGROUND

Existing methods of capturing an image to extract embedded information from an electronic device (e.g., smartphone, tablet) may be limited to the use of a physical camera of the electronic device as the primary method of image capture. Such capturing involves several user interactions which tend to interrupt or obstruct presently ongoing activities, such as when a user is watching a video and does not want to be interrupted. The existing methods merely capturing images with the physical camera. However, this is limited and does not allow the user to capture images with embedded information on the electronic device screen they are currently viewing.

SUMMARY

One aspect of the present disclosure relates to a system configured to determine a machine-readable optical code based on a stored screen-captured image of content displayed on a screen of a client computing platform. The screen-captured image may be initiated by a user associated with the client computing platform. The screen-captured video may be parsed for a machine-readable optical code of which embedded information may be extracted from and decoded for metadata. Thus, the system removes the requirement of activating a physical camera of a separate client computing platform to capture an image of the machine-readable optical code on the client computing platform to extract and decode the embedded information.

One aspect of the present disclosure relates to a system configured to determine a machine-readable optical code based on a stored screen-captured image. The system may include one or more hardware processors configured by machine-readable instructions, an image decoding machine, and/or other components. The machine-readable instructions may include one or more instruction components. The instruction components may include computer program components. The instruction components may include one or more of monitor component, analysis component, utilization component, and/or other instruction components.

The monitor component may be configured to monitor a directory to determine whether a screen-captured image is added. The directory may be monitored in an ongoing manner. The screen-captured image may include content displayed on a screen of a client computing platform that captured or initiated the screen-captured image.

The analysis component may be configured to effectuate performance of an image decoding machine. The image decoding machine may be configured to parse and decode images and/or video frames for information embedded into the images and/or the video frames.

As such, the image decoding machine may be configured to parse the screen-captured image for a machine-readable optical code. For example, the machine-readable optical code may be a text, a quick response code, a bar code, a character code (e.g., numerical, alphabetical, a combination thereof). The image decoding machine may be configured to extract embedded information from the machine-readable optical code. The image decoding machine may be configured to decode the embedded information for metadata.

The utilization component may be configured to effectuate, via a user interface, presentation of information derived from the metadata. The user interface may be displayed by the screen. In some implementations, the information derived from the metadata may include the metadata itself.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

One aspect of the present disclosure relates to the ability of capturing a screen of an electronic device with minimal user interaction, without activating a physical camera of the electronic device, and thereby expanding the purpose and functionality of data collection when using the electronic device.

Figure 1:
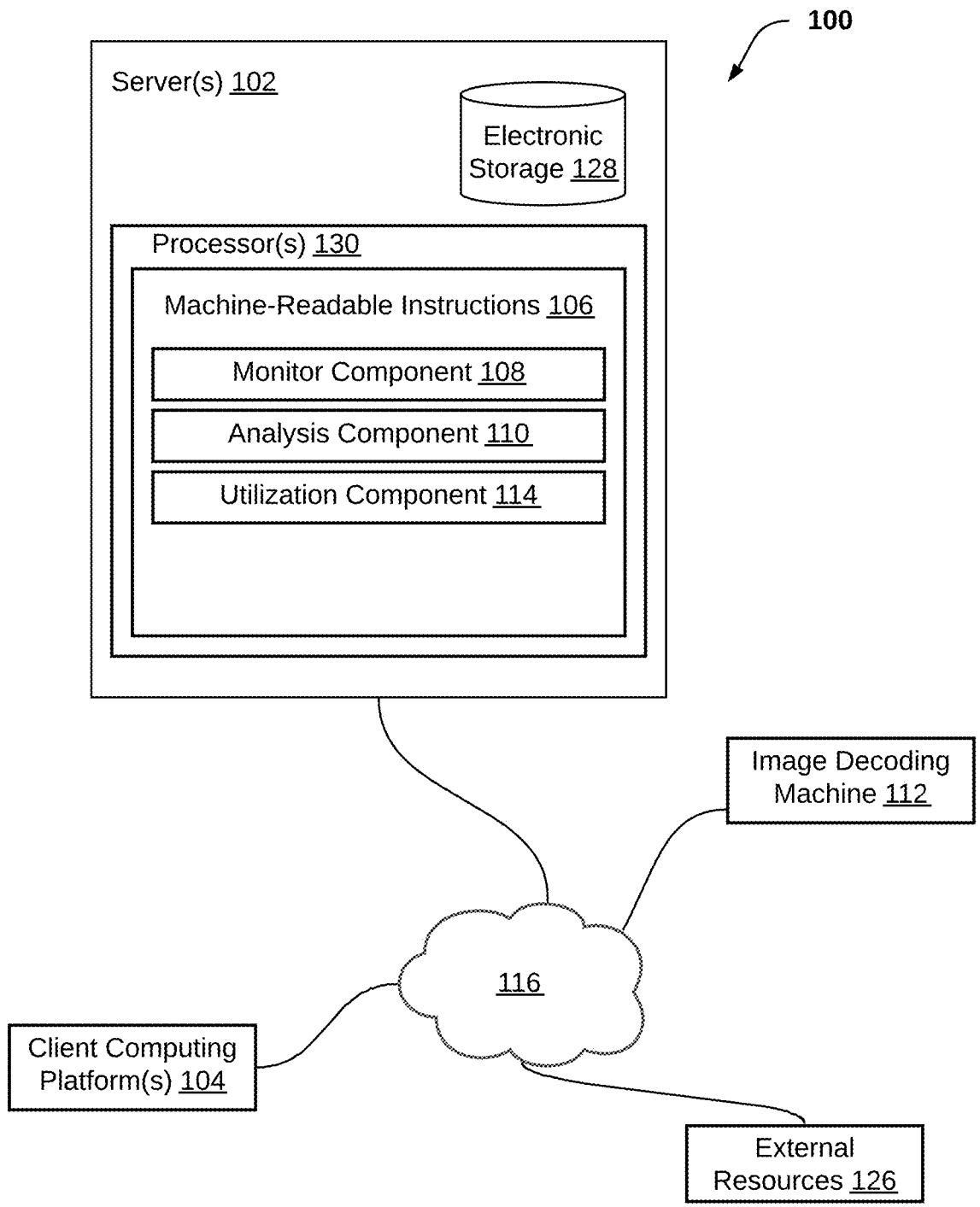
FIG. 1 illustrates a system configured to determine a machine-readable optical code based on a stored screen-captured image, in accordance with one or more implementations.

FIG. 1 illustrates a system 100 configured to determine a machine-readable optical code based on a stored screen-captured image, in accordance with one or more implementations. In some implementations, system 100 may include one or more servers 102, an image decoding machine 112, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of monitor component 108, analysis component 110, utilization component 114, and/or other instruction components.

Monitor component 108 may be configured to monitor a directory to determine whether a screen-captured image is added. The directory may be monitored in an ongoing manner. The term "ongoing manner" as used herein may refer to continuing to perform an action (e.g., monitor) periodically (e.g., every 30 seconds, every minute, every hour, etc.) until receipt of an indication to terminate. The indication to terminate may include powering off client computing platform 104, charging one or more of a battery of client computing platform 104, resetting client computing platform 104, and/or other indications of termination.

In some implementations, the screen-captured image may be captured responsive to user interaction by a user associated with client computing platform 104 with one or more user interface elements. The user interface elements may be presented via a user interface of client computing platform 104. The user interface may be displayed by a screen of client computing platform 104. The user interface may include the one or more user interface elements to facilitate the user interaction with the user interface. The user interface element may include a button, a virtual button, a draggable virtual button, a slider, and/or other elements configured to facilitate with user interaction. As used herein, the word "draggable" may refer to an interface feature, such as the virtual button, that may be repositioned on the screen/display manually, for example, by "dragging." The user interaction may include selection of the user interface element, dragging of the user interface element from a first point to a second point, pressing of the user interface element, holding down the user interface element, and/or other user interaction by the user. The first point may be different from the second point. For example, the user may drag the slider or the virtual button from the first point to the second point to capture the screen-captured image.

In some implementations, the screen-captured image may be captured responsive to selection of one or more physical buttons included on client computing platform 104. For example, the physical buttons included on client computing platform 104 may include a volume up button, a volume down button, a power button, a home button, an alphabetical character button, a numerical character button, a symbol button, a shift button, and/or other physical buttons that may be commonly present on client computing platforms 104 (e.g., space bar, escape button, function button, etc.). In some implementations, more than one of the physical buttons may be selected at once to capture the screen-captured image and/or for a particular period of time. Such selection of the one or more physical buttons and/or the particular period of time may be native to an operating system of client computing platform 104.

In some implementations, the directory may be stored in electronic storage 128. In some implementations, electronic storage 128 may be local to client computing platform 104. In some implementations, electronic storage 128 may be external to client computing platform 104 and linked or connected to a local electronic storage of client computing platform 104 via a network 116. That is, upon images, videos, and/or other information (e.g., the screen-captured image) being added and thus stored to the local electronic storage, the images, the videos, and/or other information may be automatically stored to electronic storage 128. In some implementations, upon the images, the videos, and/or other information being stored to electronic storage 128 automatically, the images, the videos, and/or other information may be removed the local electronic storage. In some implementations, some of the images, the videos, and/or other information types may be configured to be removed upon automatic storage to electronic storage 128. For example, screen-captured images may be removed from the local electronic storage upon automatic storage to electronic storage 128 (that is external to client computing platform 104), while captured images and videos via a camera of client computing platform 104 remain in the local electronic storage. In some implementations, the directory may be stored in cloud storage. In some implementations, electronic storage 128 may be the cloud storage. In some implementations, the cloud storage may be hosted by other cloud storage entities.

In some implementations, a particular sub-directory of the directory that particularly aggregates screen-captured images captured by client computing platform 104 may be monitored to determine new ones of the screen-captured images added. As such, the screen-captured image may be determined as added. The particular sub-directory may be specified by the user, specified by an administrative user, or known based on an operating system of client computing platform 104. In some implementations, the particular sub-directory or the directory to be monitored by monitor component 108 may be specified by the user, specified by the administrative user, or known based on an operating system of client computing platform 104.

The stored screen-captured image may include content displayed on the screen of client computing platform 104 that captured the screen-captured image as described herein. In some implementations, the screen-captured image may include a video frame of the content, and/or other information. The video frame may be a still single image of which comprises a part of a video displayed on the screen and where a plurality of video frames comprises the video. The screen-captured image, and thus in some implementations the video frame, may be visual information that the user views on the entire screen of client computing platform 104, and/or a user-selected portion of the screen.

In some implementations, the screen-captured image may include one or more images displayed on the screen. The one or more images may include machine-readable optical codes. For example, the one or more images displayed on the screen may be social media posts. At least one of the social media posts may be entirely captured in the screen-captured image and a portion of other social media posts (e.g., a top portion) may be captured in the screen-captured image. In some implementations, social media posts, images, and/or video frame included in the screen-captured image may not be included in their entirety while the machine-readable optical codes included thereof are included in the screen-captured image in their entirety.

In some implementations, the screen-captured image may include the one or more machine-readable optical codes by virtue of including the images that have the machine-readable optical codes. In some implementations, the screen-captured image may include the one or more machine-readable optical codes in addition to the images, the video frame, and/or other information displayed on the screen at a time the screen-captured image was taken. Machine-readable optical codes may include, by way of non-limiting example, a Quick Response (QR) code, a bar code, a numerical character code, an alphabetical character code (e.g., text), an alpha-numeric character code, symbolic code, a combination thereof, and/or other machine-readable optical codes.

The text may include one word, a phrase, a sentence, a plurality of sentences, and/or other variations of text. In some implementations, the text may include a numerical code, an alphabetical code, an alpha-numeric code and/or other machine-readable optical codes included in the text. In some implementations, the text may be one or more of a typeface (e.g., Arial, Helvetica, Times New Roman, etc.), a size, a weight, a slope style, a width, capitalization, and/or other features of text. In some implementations, the text may include multiple typefaces, sizes, weights, slope styles, widths, and/or capitalizations. In some implementations, the text may include superscripts and/or subscripts. For example, the size of the text may include 8 point, 12 point, 14 point, a combination of different sizes, or other sizes. For example, the weight of the text may include thin, ultra-light, light, regular, medium, semi-bold, bold, extra bold, combinations thereof, and/or other weights. In some implementations, the text may be of a font (i.e., a particular typeface, size, and weight). The slope style may include an italic type and an oblique type. The width may include narrow, compressed, wide, extended, expanded, and/or other widths. In some implementations, the numerical code, the alphabetical code, and the alpha-numeric code that may be the machine-readable optical code may include one or more of the typeface (e.g., Arial, Helvetica, Times New Roman, etc.), the size, the weight, the slope style, the width, and/or other variations. The capitalization may include a capital letter or roman numeral, a lowercase letter or roman numeral, a combination of both, or other capitalizations. In some implementations, the text may be a particular color or multiple colors. In some implementations, the text may be handwritten.

In some implementations, analysis component 110 may be configured to transmit, transfer, and/or otherwise communicate the stored screen-captured image to an external resource (e.g., image decoding machine 112) and/or component. Analysis component 110 may be configured to effectuate performance of image decoding machine 112. The transmission, the transfer, the otherwise communication of the stored screen-captured image to the external resource (e.g., image decoding machine 112) and/or component, and/or effectuation of performance of image decoding machine 112 may be responsive to the determination that the screen-captured image is included in the directory or the sub-directory. Image decoding machine 112 may be configured to parse and decode individual images (e.g., the screen-captured image), a video frame as the image, and/or video frames that comprise a screen-captured video for information embedded into the images and/or the individual video frames. In some implementations, image decoding machine 112 may be configured to receive the images, the video frame as the image, and/or the video frames that comprise the screen-captured video.

In some implementations, image decoding machine 112 may be integrated or otherwise a part of server(s) 102. In some implementations, image decoding machine 112 and server(s) 102 may be operatively linked via one or more electronic communication links. As such, the server(s) 102 and image decoding machine 112 may communicate via network 116 such as the Internet and/or other networks. Image decoding machine 112 may include, without limitation, a machine algorithm to decode the images and/or video frames for (embedded) information.

Image decoding machine 112 may be configured to parse the screen-captured image for the one or more machine-readable optical codes. In some implementations, image decoding machine 112 may be configured to parse the individual video frames for the one or more machine-readable optical codes. Parsing the screen-captured image may include determining boundaries of the individual machine-readable optical codes. For example, corners, edges, a numerical character that begins a numeric code or an alpha-numeric code, an alphabetical character that begins an alphabetic code or an alpha-numeric code, a numerical character that is last in the numeric code or the alpha-numeric code, an alphabetical character that is last in the alphabetic code or the alpha-numeric code, and/or other boundaries of the individual machine-readable codes may be determined. Upon determining the boundaries and thus the entirety of the machine-readable optical code, image decoding machine 112 may be configured to extract embedded information from the machine-readable optical code. In some implementations, upon determining less than all the boundaries of the machine-readable optical code, and thus not the entire machine-readable optical code, image decoding machine 112 may be not configured to extract the embedded information.

Image decoding machine 112 may be configured to extract the embedded information from the machine-readable optical code. The embedded information may include metadata and/or other information interpretable by a human and/or a machine (e.g., image decoding machine 112). By way of non-limiting illustration, the metadata may include values to an author, a creator, an owner, times and/or dates (e.g., date created, date uploaded, date modified, date manufactured), a file size, a merchant, a website, a location, and/or other metadata. In some implementations, upon determining less than all the boundaries of the machine-readable optical code, and thus not the entire machine-readable optical code, image decoding machine 112 may be configured to extract some of the embedded information.

Image decoding machine 112 may be configured to decode the embedded information for the metadata. Decoding may be performed for the stored screen-captured images with the machine-readable optical codes where the embedded information had been extracted from them. Decoding the embedded information for the metadata may include translating the embedded information into human-readable information and/or readable by a particular machine. In some implementations, the metadata may be human-readable and/or readable by other machines.

In some implementations, image decoding machine 112 may be configured to perform optical character recognition (OCR) on the text that is the machine-readable optical code. In some implementations, other types of OCR may be performed including optical word recognition, intelligent character recognition, intelligent word recognition, and/or other types of OCR alternatively or simultaneously.

In some implementations, the performance of the OCR may occur prior to the parsing of the screen-captured image to facilitate parsing the screen-captured image for the text. In some implementations, the performance of the OCR may occur prior to the extraction of the embedded information so that the embedded information extracted from the text includes information conveyed by the text and/or additional information. That is, for example, upon the text conveying "123 First Street", such text may be recognized by the OCR, the embedded information extracted from the text may include "123 First Street" as a part of an address and a remainder of the address (e.g., unit number, city, state, zip code). In some implementations, performance of the OCR may occur prior to the decoding of the extracted embedded information for the metadata to facilitate translating the determined embedded information into the human-readable information or readable information by a particular machine. In some implementations, the performance of the OCR may occur at all or some of the stages performed by image decoding machine 112.

In some implementations, the screen-captured image may be parsed for, or the OCR is performed to, recognize a particular text or other machine-readable optical code. For example, the screen-captured image may be parsed for a first phrase as defined by the administrative user, the user, and/or other users. In some implementations, the text to perform OCR for may be defined by the administrative user of system 100 (e.g., a keyword), the user, and/or other users prior to the capturing of the screen-captured image stored. For example, the text may be a particular word or phrase. In some implementations, the text may begin or end with a particular glyph (i.e., letter, numeral, symbol) as defined by the administrative user, the user, and/or other users. In some implementations, the text may be of or include particular ones of the typeface (e.g., Arial, Helvetica, Times New Roman, etc.), the size, the weight, the slope style, the width, the capitalization, the subscripts, the superscripts, and/or other text variations as defined by the administrative user, the user, and/or other users. Furthermore, for example, the first phrase that the screen-captured image is parsed for may particularly begin with a letter "a" in a first typeface and a first weight as defined by the administrative user, the user, and/or other users.

Utilization component 114 may be configured to effectuate, via the user interface, presentation of information derived from the metadata. The information derived from the metadata may include the metadata itself. The information derived from the metadata may facilitate a transaction, authentication, access (e.g., virtual access, physical access (e.g., to a facility), etc.), identification (e.g., government identification, work identification, security identification), configuration of a device (e.g., client computing platform 104), providing information (e.g., coupons, event details, contact information, product information, offer information, location information, social network pages, etc.), and/or other actions.

In some implementations, the information derived from the metadata may include a prompt for user interaction from a user associated with client computing platform 104. For example, the prompt may include a hyperlink, one or more secondary user interface elements, text, and/or other information. The one or more secondary user interface elements may facilitate inputting user input from the user. The one or more secondary user interface elements may include a dropdown menu, text-input fields, radio buttons, check boxes, and/or other secondary user interface elements.

In some implementations, utilization component 114 may be configured to effectuate communication of the information derived from the metadata to a second client computing platform 104 different from the client computing platform 104. The communication to second client computing platform 104 may facilitate the transaction, the authentication, the access, the identification, the configuration of the device, the providing information, and/or other actions.

Figure 3A:
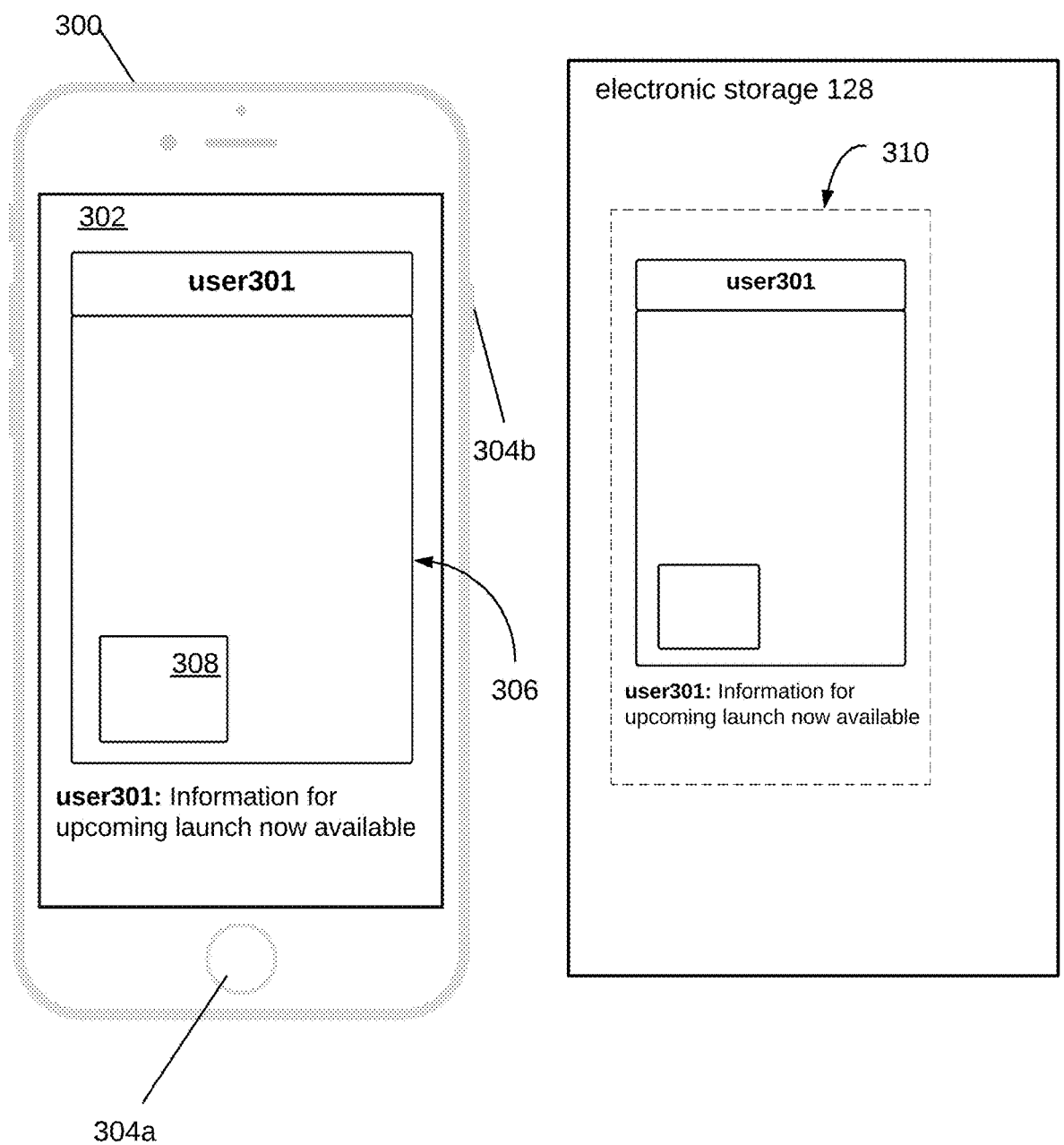
FIG. 3A-C illustrates an example implementation of the system configured to determine a machine-readable optical code based on a stored screen-captured image, in accordance with one or more implementations.
Figure 3B:
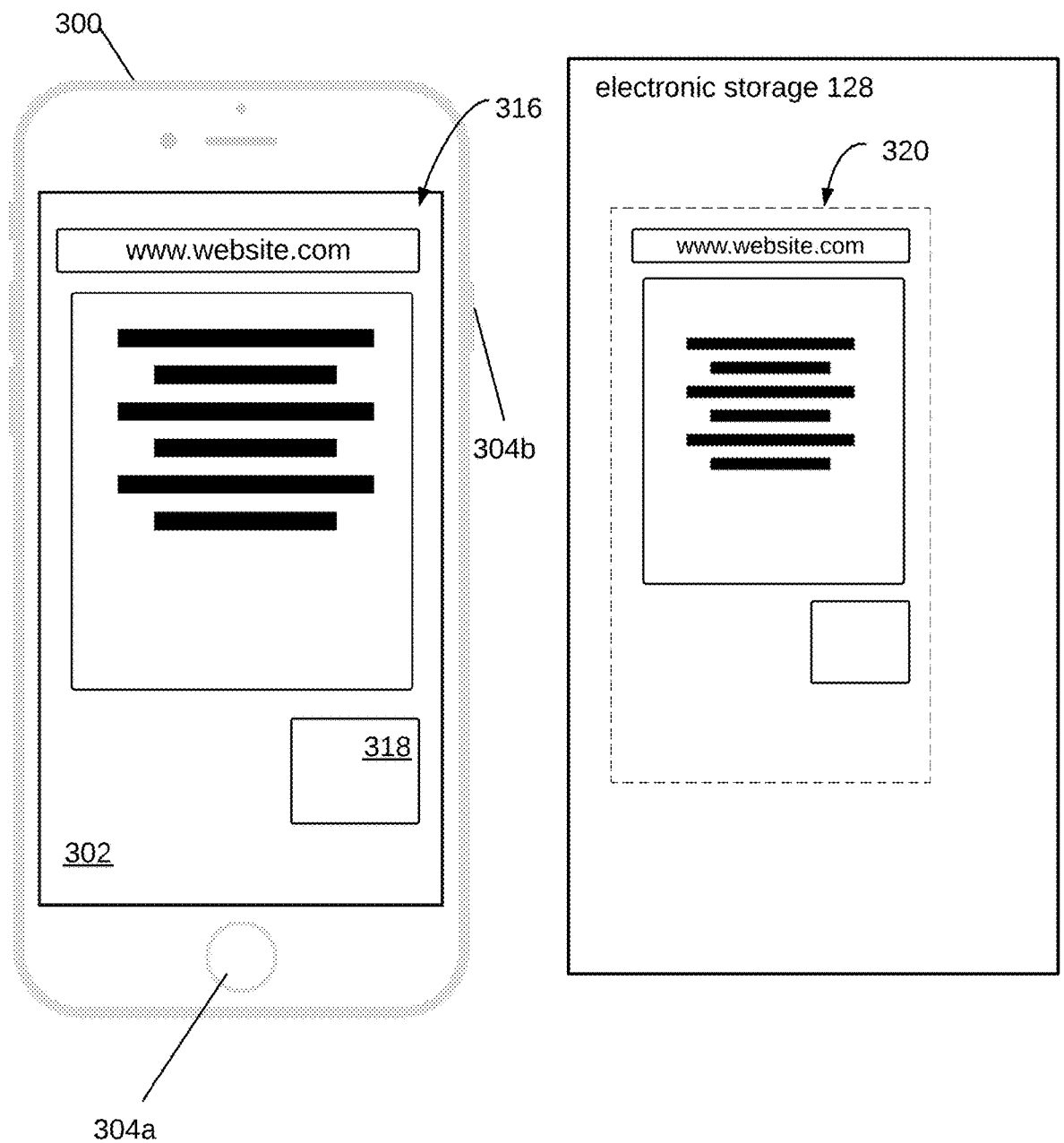
Figure 3C:
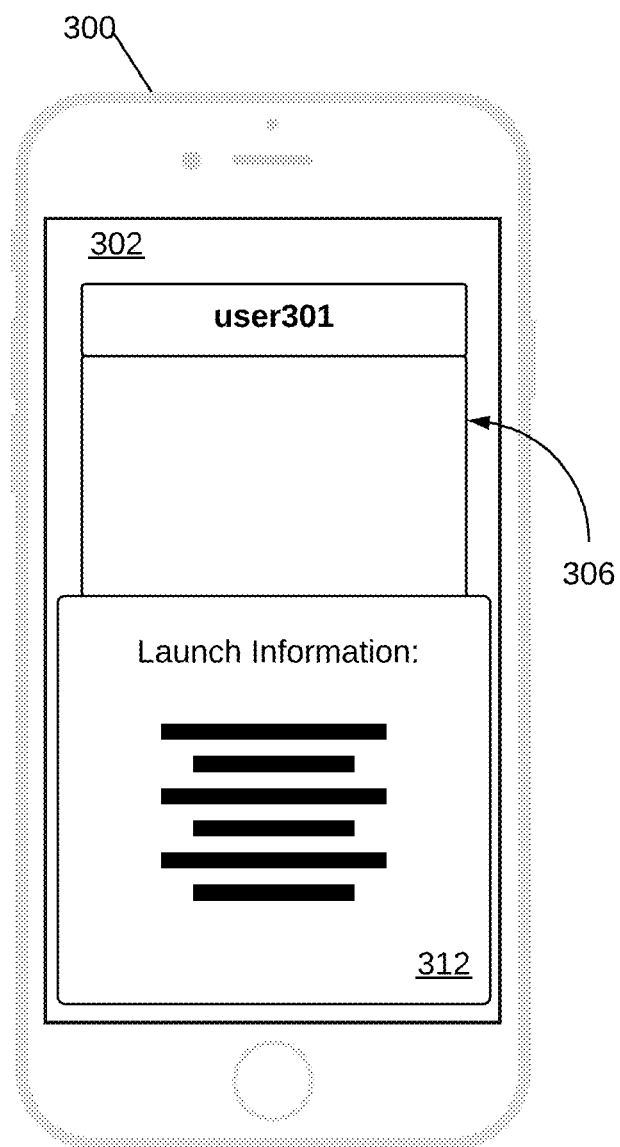

FIG. 3A-C may illustrate an example implementation of the system configured to determine a machine-readable optical code based on a stored screen-captured image, in accordance with one or more implementations. FIG. 3A may illustrate a screen 302 of a smartphone 300. Screen 302 may display an image 306 (e.g., as part of a social media post) that includes a machine-readable optical code 308. A user may select physical buttons 304a and 304b at the same time to capture a screen-captured image 310. Screen-captured image 310 may include all content displayed on screen 302. Screen-captured image 310 be stored to electronic storage 128 (the same as or similar to FIG. 1).

As another example implementation of the content displayed on screen 302, FIG. 3B may illustrate screen 302 of smartphone 300 where screen 302 may display a website 316 (e.g., www.website.com) that includes a machine-readable optical code 318. As a result of the user selecting physical buttons 304a and 304b at the same time, a screen-captured image 320 may be captured. Screen-captured image 320 may include all the content displayed on screen 302. Screen-captured image 320 be stored to electronic storage 128 (the same as or similar to FIG. 1).

Referring back to FIG. 3A, screen-captured image 310 may include machine-readable optical code 308 by virtue of image 306 displayed on screen 302 including machine-readable optical code 308 and thus may be parsed (by image decoding machine 312 of FIG. 1) for machine-readable optical code 308. Screen-captured image 310 may include machine-readable optical code 308 of which embedded information may be extracted from. The embedded information may be subsequently decoded (by image decoding machine 112 of FIG. 1) for metadata. FIG. 3C may illustrate derived information 312 from the metadata which may be presented on screen 302 that included image 306.

Referring to back FIG. 1, in some implementations, server(s) 102, client computing platform(s) 104, image decoding machine 112, and/or external resources 126 may be operatively linked via one or more electronic communication links. For example, such electronic communication links may be established, at least in part, via network 116 such as the Internet and/or other networks. It will be appreciated that this is not intended to be limiting, and that the scope of this disclosure includes implementations in which server(s) 102, client computing platform(s) 104, image decoding machine 112, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s)

102 may include communication lines, or ports to enable the exchange of information with network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 114, and/or other components and/or some or all functionality of image decoding machine 112. Processor(s) 130 may be configured to execute components 108, 110, and/or 114, other components, and/or some or all functionality of image decoding machine 112 by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 114 are illustrated in FIG. 1 as being implemented within a single processing unit, in implementations in which processor(s) 130 includes multiple processing units, one or more of components 108, 110, and/or 114 may be implemented remotely from the other components. The description of the functionality provided by the different components 108, 110, 114, and/or image decoding machine 112 described below is for illustrative purposes, and is not intended to be limiting, as any of components 108, 110, 114, and/or image decoding machine 112 may provide more or less functionality than is described. For example, one or more of components 108, 110, 114, and/or image decoding machine 112 may be eliminated, and some or all of its functionality may be provided by other ones of components 108, 110, 114, and/or image decoding machine 112. As another example, processor(s) 130 may be configured to execute one or more additional components that may perform some or all of the functionality attributed below to one of components 108, 110, 114, and/or image decoding machine 112.

Figure 2:
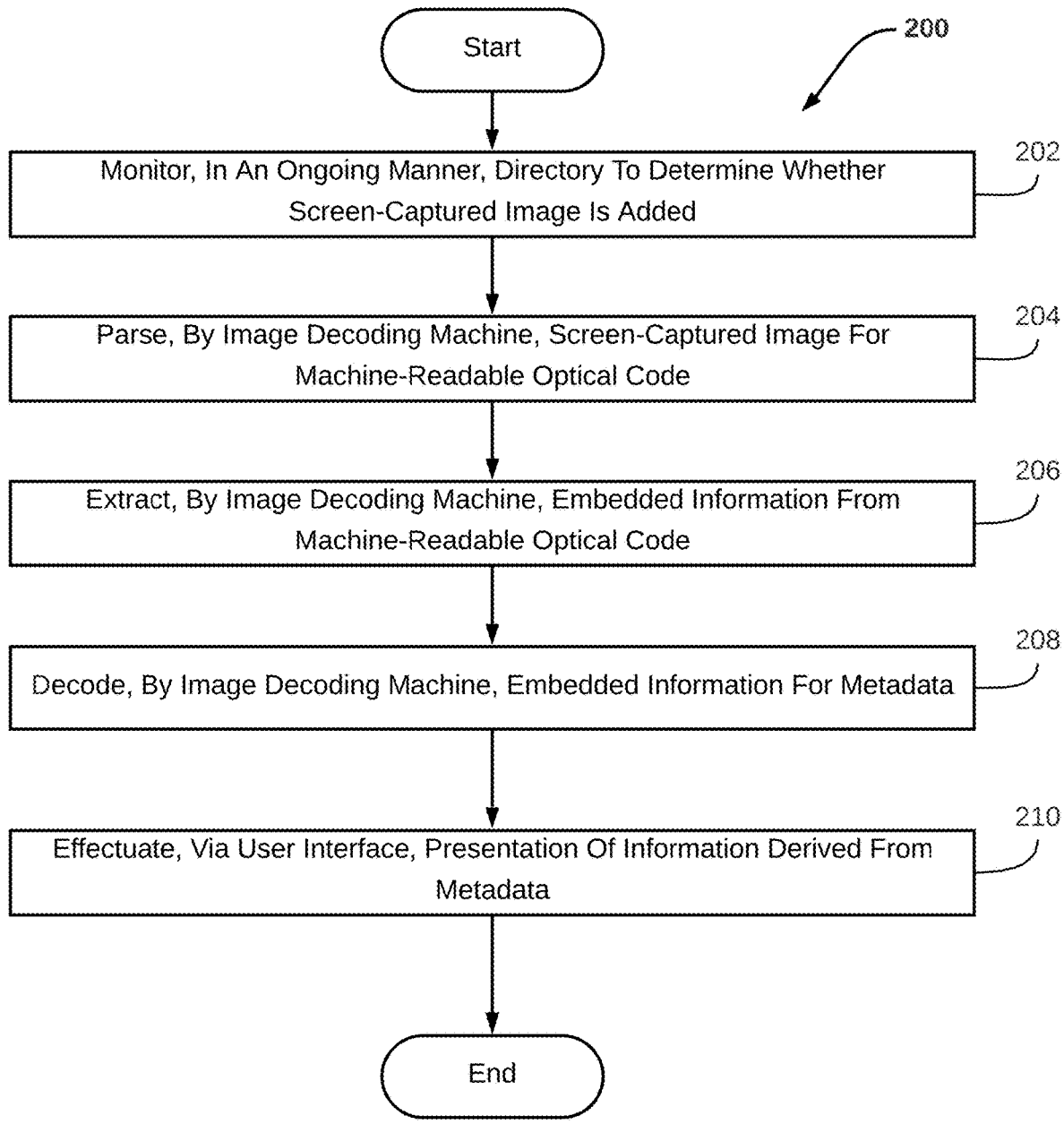
FIG. 2 illustrates a method configured to determine a machine-readable optical code based on a stored screen-captured image, in accordance with one or more implementations.

FIG. 2 illustrates a method 200 configured to determine a machine-readable optical code based on a stored screen-captured image, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include monitoring, in an ongoing manner, a directory to determine whether a screen-captured image is added. The screen-captured image may include content displayed on a screen of the client computing platform. Operation 202 may be performed by one or more hardware processors configured by machine-readable instructions including a component that is the same as or similar to monitor component 108, in accordance with one or more implementations.

An operation 204 may include parsing, by an image decoding machine, the screen-captured image for a machine-readable optical code. The image decoding machine may be configured to parse and decode images and/or video frames for information embedded into the images and/or the video frames. The parsing may be responsive to the determination that the screen-captured image is included in the directory. Operation 204 may be performed by one or more hardware processors configured by machine-readable instructions including a component that is the same as or similar to analysis component 110 and image decoding machine 112, in accordance with one or more implementations.

An operation 206 may include extracting, by the image decoding machine, embedded information from the machine-readable optical code. The extraction may be performed for the screen-captured image with the machine-readable optical code. Operation 206 may be performed by a component that is the same as or similar to image decoding machine 112, in accordance with one or more implementations.

An operation 208 may include decoding, by the image decoding machine, the embedded information for metadata. Operation 208 may be performed by a component that is the same as or similar to image decoding machine 112, in accordance with one or more implementations.

An operation 210 may include effectuating, via the user interface, presentation of information derived from the metadata. Operation 210 may be performed by one or more hardware processors configured by machine-readable instructions including a component that is the same as or similar to utilization component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine a machine-readable optical code based on a stored screen-captured image, the system comprising:
    image decoding machine configured to parse and decode images and/or video frames for information embedded into the images and/or video frames; and
    one or more processors configured by machine-readable instructions to:
        monitor, in an ongoing manner, a directory to determine whether a screen-captured image is added, wherein the screen-captured image includes content displayed on a screen of a client computing platform that captured the screen-captured image;
        effectuate, responsive to the determination that the screen-captured image is included in the directory, the image decoding machine to:
            (i) parse the screen-captured image for a machine-readable optical code;
            (ii) extract embedded information from the machine-readable optical code; and
            (iii) decode the embedded information for metadata; and
        effectuate, via the user interface, presentation of information derived from the metadata.

2. The system of claim 1, wherein the one or more processor configured by the machine-readable instructions to:
    effectuate communication of the information derived from the metadata to a second client computing platform different from the client computing platform.

3. The system of claim 1, wherein the screen-captured image is captured responsive to selection of one or more physical buttons included on the client computing platform.

4. The system of claim 1, wherein the screen-captured image is captured responsive to selection of one or more user interface elements presented via a user interface of the client computing platform.

5. The system of claim 1, wherein the directory is stored in electronic storage on the client computing platform.

6. The system of claim 1, wherein the directory is stored in cloud storage.

7. The system of claim 1, wherein a particular subdirectory of the directory that aggregates screen-captured images captured by the client computing platform is monitored to determine new ones of the screen-captured images added such that the screen-captured image is determined.

8. The system of claim 1, wherein the information derived from the metadata includes a prompt for user interaction from a user associated with the client computing platform.

9. The system of claim 1, wherein the machine-readable code includes one or more of alphabetical characters, numerical characters, symbols, a bar code, and a quick response code.

10. A method to determine a machine-readable optical code based on a stored screen-captured image, the method comprising:
    monitoring, in an ongoing manner, a directory to determine whether a screen-captured image is added, wherein the screen-captured image includes content displayed on a screen of a client computing platform that captured the screen-captured image;
    parsing, by an image decoding machine, the screen-captured image for a machine-readable optical code responsive to the determination that the screen-captured image is included in the directory, wherein the image decoding machine configured to parse and decode images and/or video frames for information embedded into the images and/or video frames;
    extracting, by the image decoding machine, embedded information from the machine-readable optical code; and
    decoding, by the image decoding machine, the embedded information for metadata; and
    effectuating, via the user interface, presentation of information derived from the metadata.

11. The method of claim 10, further comprising:
    effectuating communication of the information derived from the metadata to a second client computing platform different from the client computing platform.

12. The method of claim 10, wherein the screen-captured image is captured responsive to selection of one or more physical buttons included on the client computing platform.

13. The method of claim 10, wherein the screen-captured image is captured responsive to selection of one or more user interface elements presented via a user interface of the client computing platform.

14. The method of claim 10, wherein the directory is stored in electronic storage on the client computing platform.

15. The method of claim 10, wherein the directory is stored in cloud storage.

16. The method of claim 10, wherein a particular subdirectory of the directory that aggregates screen-captured images captured by the client computing platform is monitored to determine new ones of the screen-captured images added such that the screen-captured image is determined.

17. The method of claim 10, wherein the information derived from the metadata includes a prompt for user interaction from a user associated with the client computing platform.

18. The method of claim 10, wherein the machine-readable code includes one or more of alphabetical characters, numerical characters, symbols, a bar code, and a quick response code.

* * * * *